April 7, 1925.
R. L. CARTER
1,532,683
COMBINED MORTISING AND SHAPING MACHINE
Filed Oct. 20, 1924    2 Sheets-Sheet 1
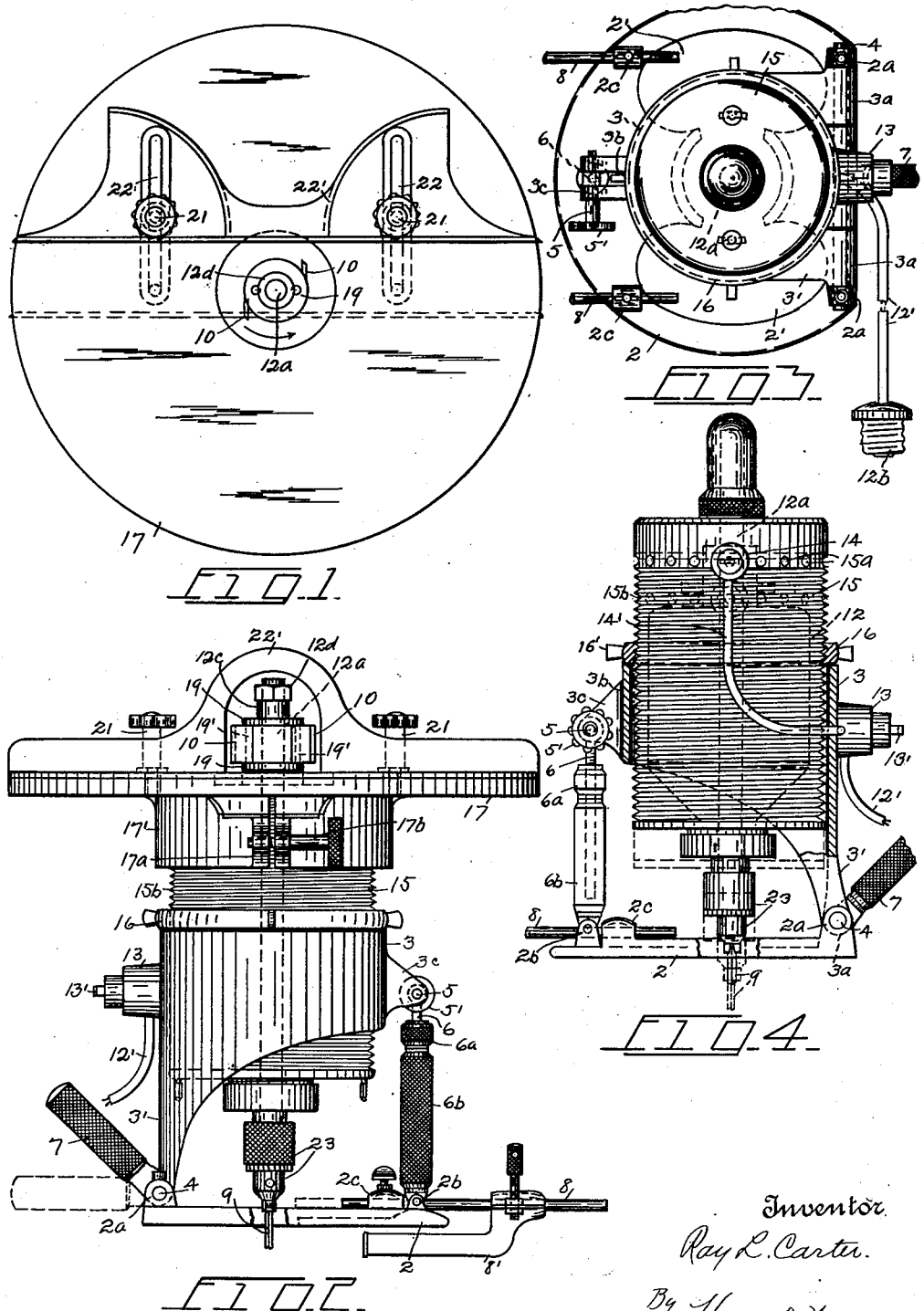

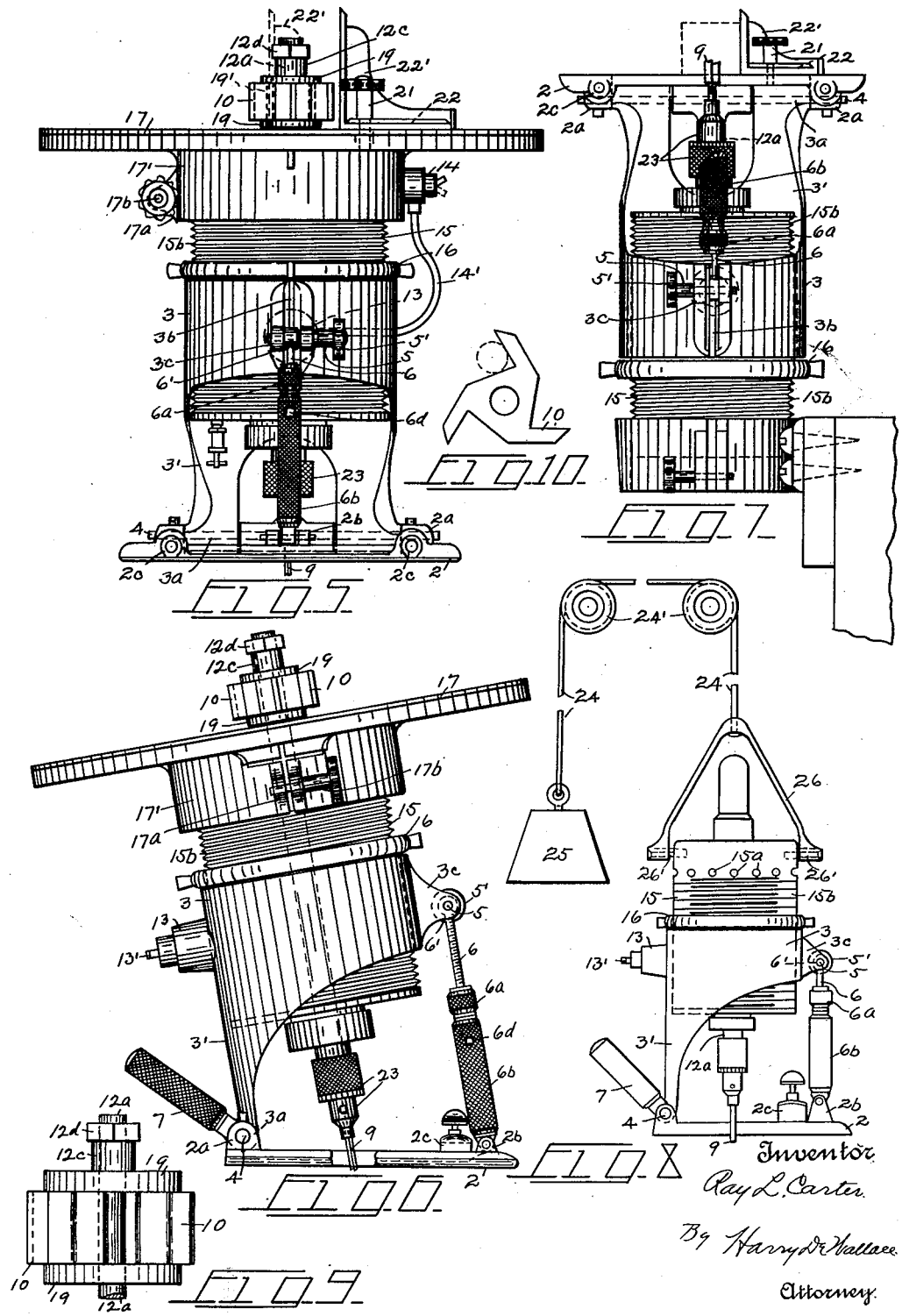

Patented Apr. 7, 1925.

1,532,683

UNITED STATES PATENT OFFICE.

RAY L. CARTER, OF SYRACUSE, NEW YORK.

COMBINED MORTISING AND SHAPING MACHINE.

Application filed October 20, 1924. Serial No. 744,720.

*To all whom it may concern:*

Be it known that I, RAY L. CARTER, a citizen of the United States, residing at Syracuse, in the county of Onondaga and State of New York, have invented certain new and useful Improvements in Combined Mortising and Shaping Machines, of which the following is a specification.

This invention relates to combined mortising, routing and shaping machines, designed particularly for shop and factory service, and has for its object to provide a novel, simple and convenient portable device of the class, that contains its own motive power, the said machine preferably being electrically driven, and being readily movable from place to place and operatively applied to various work, by hand; a portion of said machine being adjustable for routing and mortising at different depths within a certain range; another portion of the machine being adjustable for effecting various shaping work; the said machine also being arranged to be inverted for performing mortising and routing of light articles which may be manually applied to the machine, and being equipped with means for reversing the direction of rotation of the common driving shaft that operates the various tools. A further object is to provide novel means for supporting the motor and related parts, and for adjusting and setting the said parts relatively to the support, the latter means comprising a threaded part capable of fine and accurate adjustment for predetermining depths of cuts, &c. A further object is to provide means for counter-balancing the machine for facilitating its ready movement over certain classes of work. And a further object is to provide novel means for tilting the working parts and their support, for performing work at different angles relatively to the plane of the base.

The various features and parts of the invention will be understood from the detailed description which follows, and by reference to the accompanying drawings, in which—

Figure 1 is a top-plan view of the machine; showing the table above which the shaping tools rotate. Fig. 2 is a front side elevation of the same. Fig. 3 is a top-plan view, with the shaping mechanism removed. Fig. 4 is a front side elevation of the same. Fig. 5 is a front end elevation of the machine. Fig. 6 is a front side elevation; showing means for inclining the body of the machine relatively to the normally level base, for sinking mortises and for effecting routing work at various inclinations. Fig. 7 is a view, showing the motor and router mechanism inverted, and means for clamping the machine to a work bench. Fig. 8 is a view showing the means for counter-balancing the routing mechanism for facilitating the ready movement and control of the machine in all directions. Fig. 9 is an enlarged view of the assembled cutters which perform the shaping work. And Fig. 10 is an end view of one of the shaper cutters.

In the drawings, 2 represents a substantially circular base, which supports the combined routing and shaping mechanisms, including the common driving means; the said base having its medial portion cut away for reducing its weight, and for affording free play for the mortising and routing tools, which operate below the base, as shown at 2' in Fig. 3. At the left or rear-end of the machine, the base is provided with spaced hinge-loops 2ª, between which the downwardly extending portion 3' of a tiltable clamp-holder 3 is pivoted, by a pintle 4; the said pintle passing through the loops 2ª and also through loops 3ʰ of the holder. The front end of the holder 3 is split, as at 3ᵇ, and adjacent each margin of the split integral perforated lugs 3ᶜ are provided, the said lugs being moved towards and from each other for contracting and expanding the holder, by a threaded bolt 5, which is operable by a handle 5'. The holder is supported at its front end by a downwardly extending screw 6, whose top end is formed with a loop 6', which pivots on the bolt 5. The threaded portion of the screw 6 passes through a nut 6ª and loosely into a hollow cylindrical support 6ᵇ, the said nut rotating on the upper end of the support. The lower end of the support 6ᵇ is pivoted between lugs 2ᵇ, which are formed on the top surface of the base. The turning of the nut 6ª in the proper direction, tilts the holder 3 and the routing and other mechanisms relatively to the base 2, as shown in Fig. 6. The support 6ᵇ, and a similar part 7, which is pivoted on the pintle 4 between the lugs 3ª of the holder, serve for handles, by which the machine when operated as a router or mortiser is moved in a horizontal plane over the work. The base 2 is also provided with similar spaced perforated lugs 2ᶜ, into which may be adjustably inserted guide rods 8, upon which a gage 8' is adjustably mounted, as shown in Figs. 2, 3, 4 and 5, the said gage being employed for gaging the distance the mortises may be sunk relatively to one side of a timber, in a well-known manner.

The power for driving the mortising and routing tool 9, as well as the shaping cutters 10, is preferably derived from an electric motor 12, shown conventionally by dotted lines in Fig. 4, the current being conducted to the motor by a flexible cable 12', to the free end of which a plug 12ᵇ may be attached, for insertion into any ordinary electric-lamp socket. The cord 12' connects directly with a switch 13, which is preferably mounted on the holder 3, and is operable by the usual button 13'. The operation of the button in the proper direction starts the motor and effects the driving of the mortising tool 9, through its armature shaft 12ᵃ, in the clockwise direction. The shaping cutters 10 are preferably driven in the reverse clockwise direction, as shown by the arrow in Fig. 1. This is accomplished by a second independent winding of the motor 12, the latter winding being controlled by a suitable reversing switch 14 of ordinary construction, the latter being connected by a cable 14' with terminals of the cable 12' (not shown) located in the casing of switch 13, in a well-known manner. When the shaping cutters are to be operated, switch 13 is thrown open and switch 14 is closed. The order of the switches 13—14 is reversed when the mortising or routing tool 9 is to be used. The motor 12 is preferably enclosed in a normally open metal cylinder or casing 15, in which the motor is operatively secured. The motor and related parts are movable with the casing 15 as one part. Near its top end, the shell 15 is provided with circumferential openings 15ᵃ for the inlet of air, by which the motor is cooled; the air being discharged through the normally open bottom of the shell. The casing 15 is preferably externally threaded, as at 15ᵇ, and the said threads are engaged by an internally threaded adjusting ring 16, which rotates upon the top end of the holder 3, the bore of said holder when expanded to normal size, being larger than the diameter of the motor casing, so that the motor may be freely raised and lowered, by the rotation of the ring 16, whenever the clamping screw 5 is loosened. The tightening up of the screw 5 rigidly clamps the holder 3 against the threaded surface of the casing 15, for holding the casing and motor in the various adjusted positions. In the present case, the motor and its casing do not revolve when being adjusted, but said parts are movable linearly bodily, by the rotation of the ring 16. The holder 3 may also be locked against tilting action by the nut 6ᵃ, by a screw 6ᵈ, which operates in a threaded opening in the support 6ᵇ, and is arranged to engage the screw 6. The screw 6ᵈ has a square socket for receiving a suitable key, by which the said screw is rotated.

17 represents a relatively large circular work table, having a split depending annular flange 17', which loosely encircles the top end of the motor casing 15, the said flange being formed at the opposite sides of the split with spaced perforated lugs 17ᵃ, through which a screw 17ᵇ passes, and by which the flange may be clamped tightly to the casing 15, for holding the table rigidly in place, as shown in Figs. 1, 2, 5 and 6. The armature shaft 12ᵃ of the motor extends above the table 17, and supports a circular tool head or holder comprising spaced discs or collars 19, which are adjustable towards and from each other by dowel-pins 19', which are anchored in the lowermost disc. The cutters 10 are disposed between the collars 19, the cutters being bored out centrally to receive the corresponding pins 19', and being held from rotation on the pins by the inwardly facing arms of the cutters straddling the shaft 12ᵃ. The top end of the shaft 12ᵃ is threaded and above the cutter-head said shaft is fitted with a sleeve 12ᶜ and a nut 12ᵈ, by which the shaping parts are held rigidly in place. The table 17 is provided at one side of the cutters 10 with spaced threaded holes, for receiving clamping screws 21, which pass through slots 22 of a work-guide 22', the latter being slidable upon the top face of the table, and being adjustable towards and away from the cutters 10, for gaging the depth of the shaping cuts (see full and dotted lines in Figs. 1 and 5). The full line position of the gage 22' represents the extreme adjustment away from the center of the table, for facilitating installing and changing of the cutters, rather than for gaging the cutting work.

The lower end of the armature shaft 12ᵃ projects below the shell 15 and is fitted with a tool-holder 23, which is adjustable in a well-known manner, and into which the mortising or routing tool 9 may be chucked and held. The tool 9 is lowered and raised when the motor and shell 15 are moved bodily, by the rotation of the ring 16, as described. This operation of the ring while the table is attached to the machine, also raises and lowers the table. Ordinarily the ring 16 is only employed for adjusting the routing tool 9. The ring 16 is provided with a number of similar radial operating lugs 16', which are preferably spaced equidistantly around the ring, and afford accurate adjustment of the tool 9, by moving the lugs 16' a certain distance from any given point of the circumference of either the holder 3, or the shell 15. In practice, a quarter turn of the ring 16 moves the tool 9 vertically one-thirty-second of an inch. But finer or coarser threads may be employed for effecting broader or narrower range of adjustment, than described.

My combined routing and shaping machine may be made in different sizes to suit various classes of service, and when the complete machine weighs from 20 to 40 pounds, it is customary to provide suitable means for counterbalancing the device, so as to facilitate the ready and convenient handling of the machine. The counterbalance consists of a cable 24, which is supported by one or more overhead sheaves 24'. To one end of the cable is suspended a weight 25, the opposite end of the cable being secured to a yoke 26, which is pivoted to the top end of the casing 15, by screws 26'. The counterweight is usually from five to ten pounds lighter than the machine, and while relieving the greater part of its dead weight, the excess weight prevents the tools from chattering and enables the operator to readily move the device in all directions and to accurately trace the outlines of mortises and other pattern work.

The motor 12 without load, preferably operates at about 14000 revolutions per minute, and during the mortising and shaping periods usually maintains working speeds from 8000 to 12000 revolutions, which ensures smooth as well as extremely rapid work. My combined machine is adapted to perform many different kinds of work, and dispenses with a number of power devices and also a large variety of hand tools, such as augers, chisels, gouges, planes and the like, thereby saving considerable time and much hard and difficult work, and at the same time producing more accurate and uniform results. My high-speed machine completes all work at a single operation, and is arranged to execute a large variety of plain, as well as ornamental cuts, by the use of suitable routing and shaping tools, which may be readily and quickly applied and removed, and may be operated in different directions and at different inclinations without requiring alteration or change of any of the permanent working parts.

Having thus described my invention, what I claim, is—

1. A combined router and shaper, including a base, a hollow split cylindrical holder pivoted to the base, means for tilting the holder relatively to the plane of the base, a motor adapted to drive tools for performing work above and below said holder, said motor being disposed concentrically and loosely in said holder, means for contracting the holder for preventing endwise movement of the motor, and means for adjusting the motor axially relatively to the holder when the clamping pressure is relaxed.

2. A combined router and shaper, comprising a base, a split hollow cylindrical holder pivoted at one side to the base, means carried by the base for adjustably supporting the opposite side of the holder, a motor adapted to drive routing and shaping tools, said motor being disposed concentrically in the holder, means for operating the armature of the motor in different directions, a non-rotative casing enclosing the motor, and means engaging the casing for raising and lowering the motor axially.

3. A combined router and shaper including a base, a split hollow holder pivoted at one side to the base, means carried by the base for adjustably supporting the opposite side of the holder, a motor adapted to drive shaping and routing tools, said motor being disposed concentrically in the holder, means for operating the armature of the motor in different directions, a non-rotative casing inclosing the motor, means engaging the casing for raising and lowering the motor axially, means for locking said casing from movement in said holder, and means for locking the holder in different positions relatively to the plane of the base.

4. A combined mortising and shaping machine, including a base, a hollow split holder pivoted on said base, a motor adapted to drive tools for performing work above and below said holder, a threaded cylindrical casing inclosing the motor, said casing being disposed loosely in the holder, means engaging the threads of the casing adapted for moving the casing and motor towards and away from the base, and means for clamping the holder against the casing for preventing axial movement of the motor during the mortising and shaping operations.

5. A combined mortising and shaping machine, including a base, a hollow split holder pivoted on the base, a motor adapted to drive tools for performing work above and below the holder, a threaded hollow casing enclosing the motor, said casing being loosely disposed in the holder, means engaging the threads of the casing for moving the motor axially in the holder, a table for supporting work to be operated upon by the shaping tools, said table having a split flange for receiving one end of the casing, means for clamping said flange to the casing, and means for clamping the holder to the casing for preventing axial movement of the motor and table during the cutting periods.

6. A combined router and shaper, comprising a base, a hollow split cylindrical holder pivoted at one side of the base, means pivoted to the opposite side of the base for supporting the corresponding portion of the holder and for tilting the holder relatively to the base, a motor adapted to drive tools for performing work above and below the holder, said motor being disposed concentrically in said holder, and means rotatable on said holder for adjusting said motor axially relatively to the holder.

7. A combined router and shaper, comprising a base, a split hollow holder pivoted at one side of the base, means carried by the opposite side of the base for adjustably supporting the corresponding portion of the holder, a motor, means for operating the armature of the motor in different directions, a casing enclosing the motor and being surrounded by said holder, said casing being externally threaded, means engaging the threads of the casing and rotatable on the holder adapted for moving the motor axially relatively to the holder and base, means for locking said casing against movement in the holder, and means for locking the holder in various positions relatively to the base.

8. In a combined mortising and shaping machine, a base, a hollow split holder pivoted to the base, means for tilting the holder at different angles relatively to the base, a motor disposed in said holder, means for operatively applying tools to the motor above and below the holder, means rotatable on said holder for effecting the axial movement of the motor and tools when the holder is expanded, and means for reversing the direction of rotation of said tools.

9. A combined shaper and router, including a base, a hollow split holder pivotally mounted on the base, means for inclining the holder at different angles relatively to the base, a threaded cylinder supported axially in the holder, clamping means for holding the cylinder stationary in the holder, a threaded ring engaging the threads of the cylinder adapted to move the cylinder bodily in the holder when the clamping means is released, a motor supported in the cylinder and movable therewith having a shaft projecting above and below the cylinder adapted to support shaping and routing tools at its opposite ends, means for driving said tools in opposite directions, and means engaging said cylinder for counterbalancing the weight of the machine.

10. A combined mortising and shaping machine, including a base, a hollow split holder pivoted on the base, a motor adapted to drive tools for performing work above and below the holder, a hollow threaded casing inclosing the motor, said casing being indisposed loosely in the holder, means for clamping the holder against the casing for preventing axial movement of the motor, means engaging the threads of the casing adapted for moving the casing and motor towards and away from the base, means for driving the mortising tool clockwise, means for driving the shaping tools reverse clockwise, and means for inclining the mortising tool for cutting mortises at different angles relatively to the plane of the base.

11. A combined mortising and shaping machine, including a base, a hollow split holder pivoted to the base, means for inclining the holder at different angles relatively to the plane of the base, a motor adapted to drive tools for performing work above and below the holder, a non-rotative threaded casing surrounding said motor, said casing being partially enclosed by the holder and being movable axially therein, a ring for supporting the casing and motor, said ring engaging the threads of the casing adapted when rotated in opposite directions to raise and lower the motor and tools for varying the depth of the cuttings by the tools, means for locking said casing against endwise movements, and means pivoted to the casing for counterbalancing the weight of the machine.

In testimony whereof I affix my signature.

RAY L. CARTER.